United States Patent
Choi et al.

(10) Patent No.: US 7,307,925 B2
(45) Date of Patent: Dec. 11, 2007

(54) OPTICAL PICKUP ACTUATOR THAT REMOVES PHASE DISPERSION BY A ROLLING MODE

(75) Inventors: In Ho Choi, Seongnam-si (KR); Sam Nyol Hong, Suwon-si (KR)

(73) Assignee: LG Electronics Inc., Seoul (KR)

( * ) Notice: Subject to any disclaimer, the term of this patent is extended or adjusted under 35 U.S.C. 154(b) by 609 days.

(21) Appl. No.: 10/884,262

(22) Filed: Jul. 2, 2004

(65) Prior Publication Data

US 2005/0030843 A1    Feb. 10, 2005

(30) Foreign Application Priority Data

Jul. 4, 2003    (KR) .................. 10-2003-0045238

(51) Int. Cl.
*G11B 7/00*    (2006.01)
(52) U.S. Cl. ................................. 369/44.22
(58) Field of Classification Search ............ None
See application file for complete search history.

(56) References Cited

U.S. PATENT DOCUMENTS

| | | | | |
|---|---|---|---|---|
| 5,949,590 A * | 9/1999 | Hong | ......................... | 359/814 |
| 6,278,669 B1 * | 8/2001 | Anzai et al. | ............. | 369/44.14 |
| 6,741,543 B1 * | 5/2004 | Suzuki et al. | ............... | 720/683 |
| 6,825,999 B2 * | 11/2004 | Suzuki et al. | ............... | 359/824 |

* cited by examiner

*Primary Examiner*—Paul W. Huber
(74) *Attorney, Agent, or Firm*—Lee, Hong, Degerman, Kang & Schmadeka (57) ABSTRACT

The present invention discloses an optical pickup actuator including a lens holder having an object lens, and a driving means for changing a position of the lens holder by using an electromagnetic force. The driving means includes multipolar magnets and tracking coils for changing the position of the lens holder to the tracking direction, each of the tracking coils has a top coil, a bottom coil and side coils, and the whole or part of the side coils has an angle smaller than 90° to a horizontal line.

14 Claims, 12 Drawing Sheets

⇧ Focusing Force Direction
--→ Current Flow Direction
⤺ {Tilting Force Direction
   Tilt Moment Direction Fig.5
Related Art Fig.6
Related Art

⇨ Tracking Force(TF)

⌒ Additional backward torque (TFc)

◯ Rolling mode trouble

Fig. 10

⇨ Tracking Force Direction
⇧ Focusing Force Direction
--→ Current Flow Direction

OPTICAL PICKUP ACTUATOR THAT REMOVES PHASE DISPERSION BY A ROLLING MODE

BACKGROUND OF THE INVENTION

1. Field of the Invention

The present invention relates to an optical pickup actuator, and more particularly to an optical pickup actuator which can efficiently remove phase dispersion by a tolling mode of a lens holder caused by inconsistency between a weight center and a tracking force center of the lens holder.

2. Background of the Related Art

In general, an optical pickup actuator constantly maintains relative positions between an object lens and an optical recording medium (for example, disc), by moving constitutional elements (bobbin, lens holder, etc.) including the object lens. In addition, the optical pickup actuator records information and reproduces the recorded information, by following tracks of the optical recording medium.

Figure 1A:
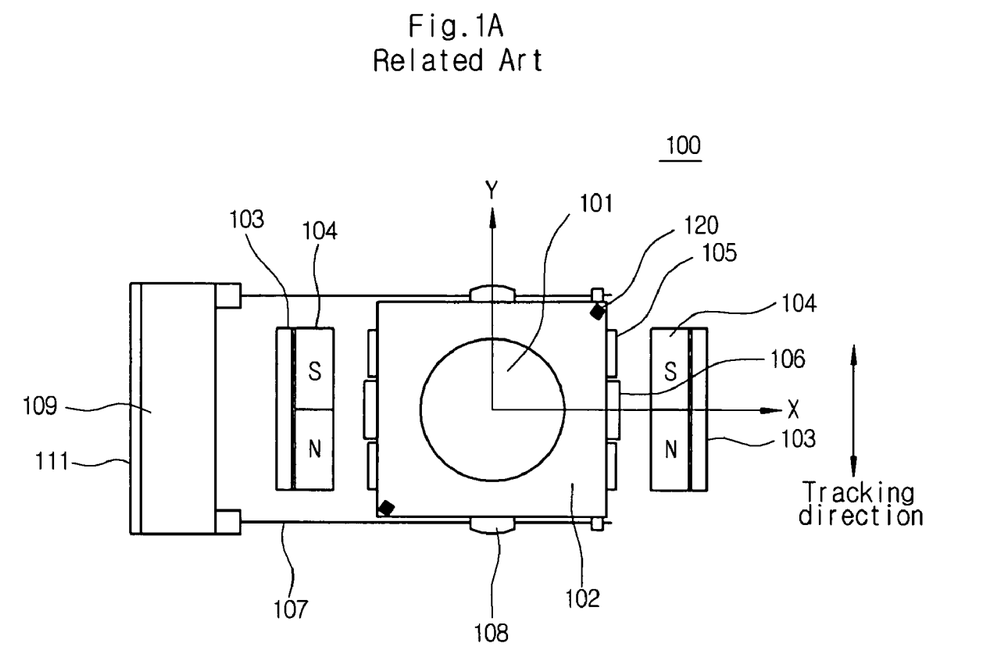
FIGS. 1A and 1B are front and side views illustrating a related optical pickup actuator.
Figure 1B:
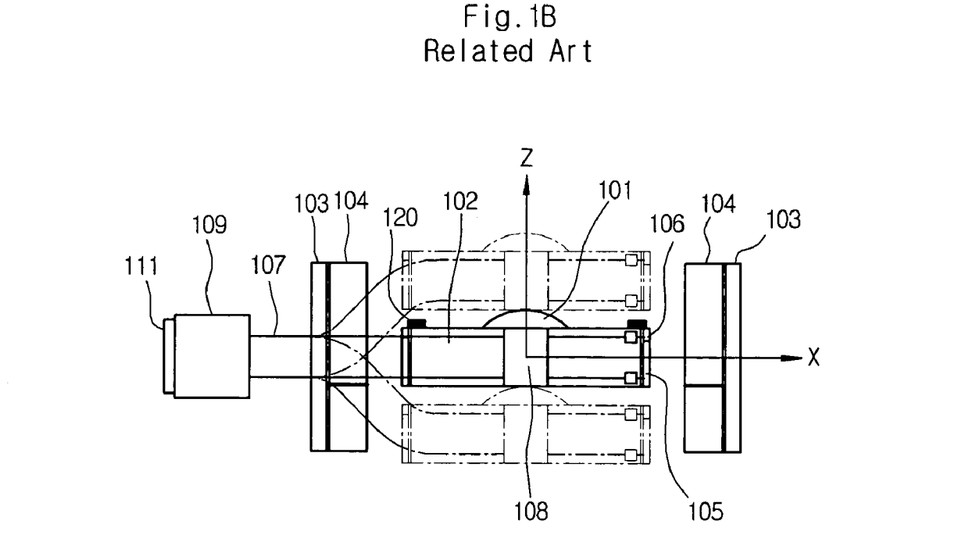
Figure 2:
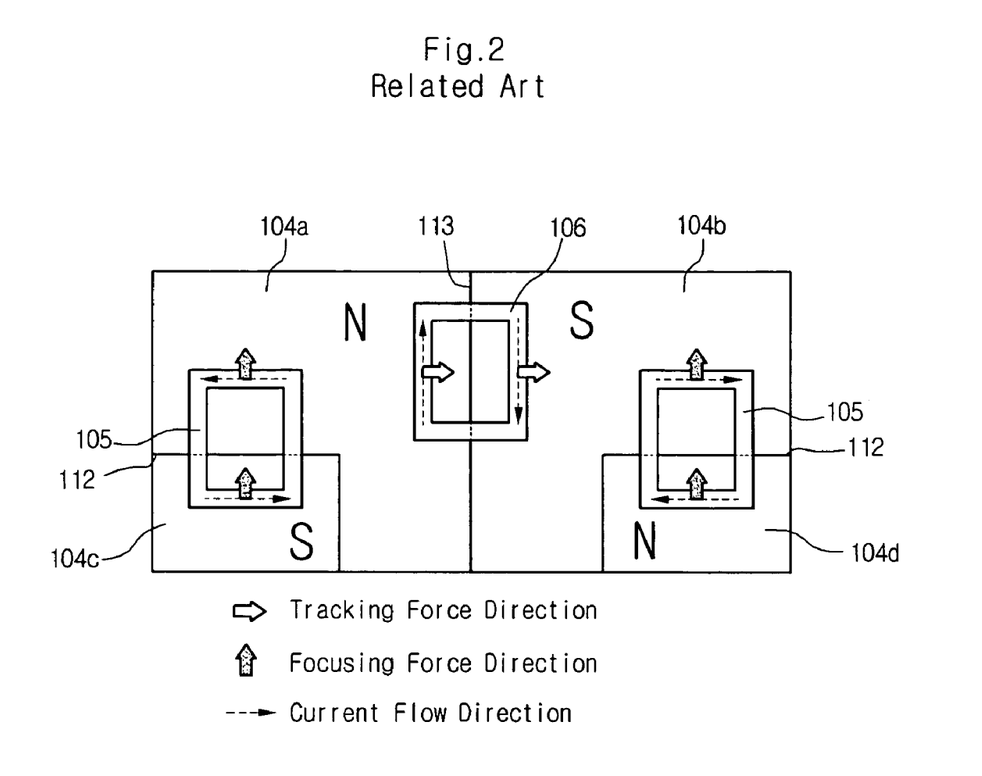
FIG. 2 illustrates a magnetic circuit of FIG. 1.

FIGS. 1A, 1B and 2 are structure views illustrating a related optical pickup actuator.

Referring to FIGS. 1A, 1B and 2, the optical pickup actuator 100 includes a lens holder 102 having an object lens 101 at its center portion and being movable, and a magnetic circuit coupled to the sides of the lens holder 102, for moving the lens holder 102. The magnetic circuit includes tracking coils 106, focusing coils 105, yokes 103 and multipolar magnets 104.

The focusing coils 105 are adhered to the left and right sides of both sides of the lens holder 102 for focusing movement, facing vertical boundary surfaces 112 of polarities of the magnets 104, respectively. The tracking coils 106 are adhered to the centers of both sides of the lens holder 102 for tracking movement, facing horizontal boundary surfaces 113 of polarities of the magnets 104, respectively.

Still referring to FIG. 2, in the magnet 104, "⌐"-shaped magnets 104a and 104b are disposed to be symmetrical to each other, and magnets 104c and 104d having the opposite polarities to polarities of the "⌐"-shaped magnets 104a and 104b are disposed at the bottom left and right ends. Here, one multipolar magnet or four unipolar magnets can be used as the magnet 104.

The centers of the tracking coils 106 face the horizontal boundary surfaces 113 of the magnets 104a and 104b having different polarities, and the centers of the focusing coils 105 face the vertical boundary surfaces 112 of the magnets 104a, 104b, 104c and 104d having different polarities.

The magnets 104 are fixed to the inside surfaces of the yokes 103 which are ferromagnetic structures adjacent to the lens holder 102. The yokes 103 are coupled to a pickup base (not shown) by an integrating means.

Fixing units 108 are formed at both sides of the lens holder 102. One-side ends of two parallel wire suspensions 107 are fixed to each of the fixing units 108, and the other-side ends of the wire suspensions 107 are fixed to a circuit board 111 through a frame 109 formed on one side of the lens holder 102. The wire suspensions 107 serve as junction lines for lifting the lens holder 102 and supplying a current.

Here, a damper (not shown) is coupled to the inside of the frame 109 to give a damping characteristic to the wire suspensions 107 having rigidity. The other-side ends of the wire suspensions 107 are fixed to the circuit board 111 disposed outside the frame 109 by soldering.

The operation of the related optical pickup actuator 100 will now be explained. The focusing coils 105 adhered to the lens holder 102 are coiled in the horizontal direction When a current is supplied to the focusing coils 105, a magnetic flux is generated in the vertical direction. Here, a magnetic flux of the multipolar magnets 104 facing the focusing coils 105 is electromagnetically operated, to generate a force in the focusing coils 105 in the vertical direction. Accordingly, the lens holder 102 moves in the focusing direction (vertical up/down), to operate a focusing servo for compensating for a focusing error.

The tracking coils 106 adhered to the lens holder 102 are coiled in the vertical direction. When a current is supplied to the tracking coils 106, a magnetic flux is generated in the horizontal direction, and thus a repulsive force is generated by the fixed multipolar magnets 104 and the electromagnetic force. The lens holder 102 moves in the tracking direction (left, right) by the repulsive force, to operate a tracking servo for compensating for a tracking error.

As described above, the lens holder 102 moves in the tracking and focusing directions with the coils 105 and 106 adhered to its both sides, which is called a moving coil method. Conversely, multipolar magnets can be adhered to the outer circumference of the lens holder 102, and move with the lens holder 102, which is called a moving magnet method. The moving methods by the magnets and coils use the Lorentz's force of the Fleming's left hand law.

Figure 3:
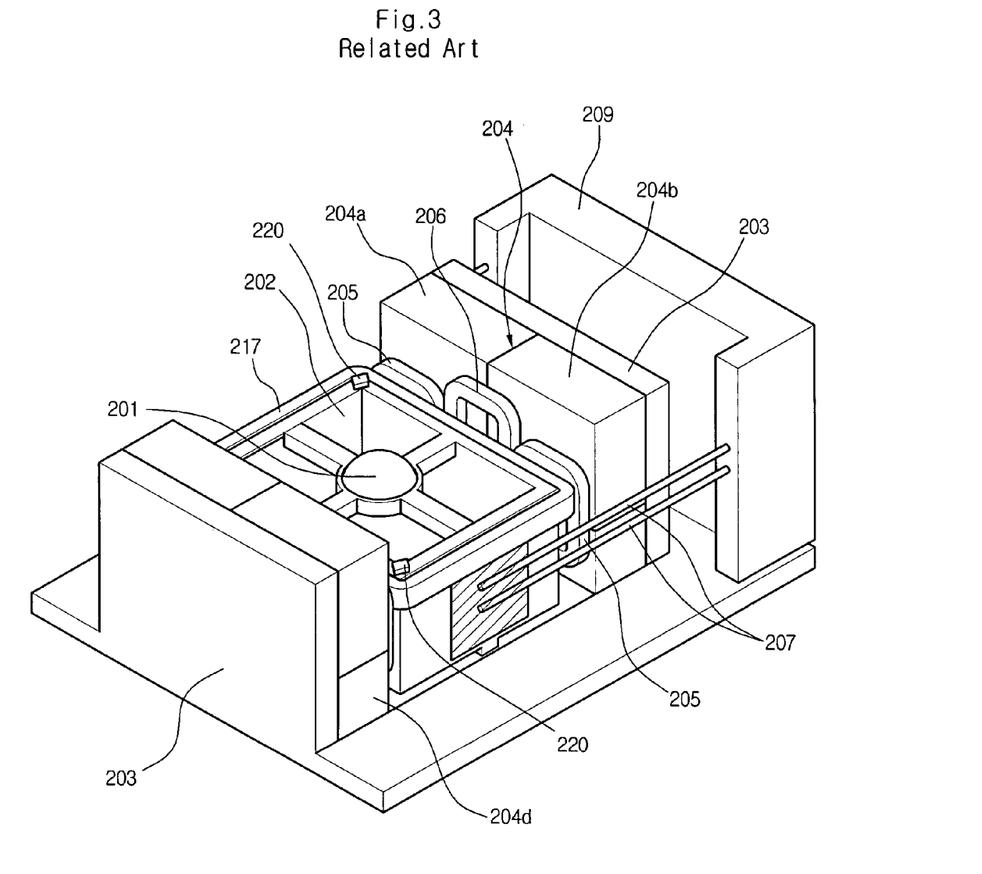
FIG. 3 is a perspective view illustrating another example of the related optical pickup actuator.
Figure 4:
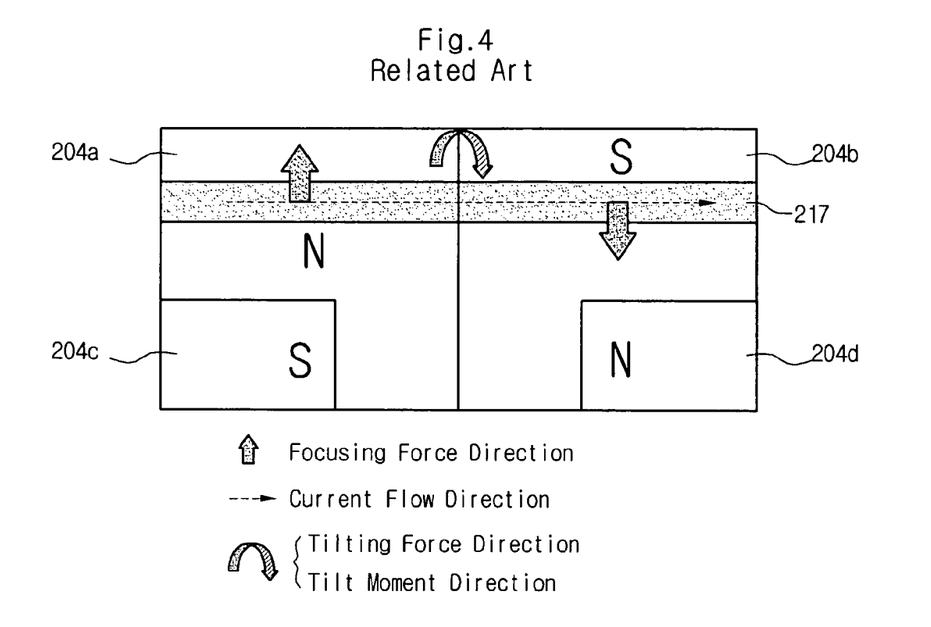
FIG. 4 illustrates tilting by radial tilting coils in a magnetic circuit of FIG. 3.

FIGS. 3 and 4 are structure views illustrating a related optical pickup actuator for radial tilting.

As illustrated in FIG. 3, radial tilting coils 217 are adhered to the circumferential surface of a lens holder 202, for moving the lens holder 202 in the radial tilting direction by an electromagnetic force with multipolar magnets 204.

That is, as shown in FIG. 4, when a current is supplied to the radial tilting coils 217 coiled on the circumferential surface of the lens holder 202, the left and right sides of the lens holder 202 are rotated in the opposite directions by different polarities of the multipolar magnets 204a and 204b facing the radial tilting coils 217.

In FIG. 3, reference numeral 201 denotes an object lens, 203 denotes a yoke, 205 denotes a focusing coil, 206 denotes a tracking coil, 207 denotes a wire suspension, and 209 denotes a frame.

The optical pickup actuator performs motion in a movable coil method by a magnetic field of the permanent magnet, and moves the object lens to a target position of an optical recording medium. Here, the lens holder which is a moving part of the optical pickup actuator is fixed by the wire suspensions having rigidity and damping characteristic, thereby obtaining a target frequency characteristic. In addition, the lens holder performs translation in the focusing direction and the tracking direction which are vertical to each other. In order to reduce an error of an optical signal, the lens holder must perform motion without unnecessary vibrations such as rotation or twisting.

Figure 5:
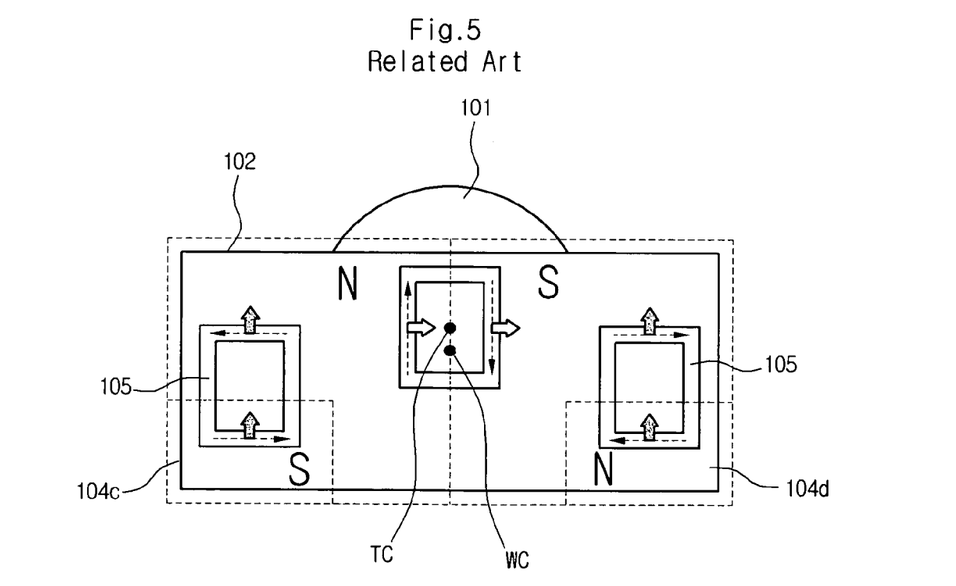
FIG. 5 illustrates inconsistency between a weight center and a tracking center in the related optical pickup actuator.

However, as depicted in FIG. 5, when the lens holder is driven in the tracking direction, a weight center WC and a tracking force center TC are inconsistent. Therefore, the lens holder is operated in a rolling mode in a high band frequency, and phase dispersion is caused in the rolling frequency. Generally, the rolling frequency is generated between 100 and 120 Hz, may be identical to a rotary frequency of a disc, and has detrimental effects on a control system due to a tilted angle.

Figure 6:
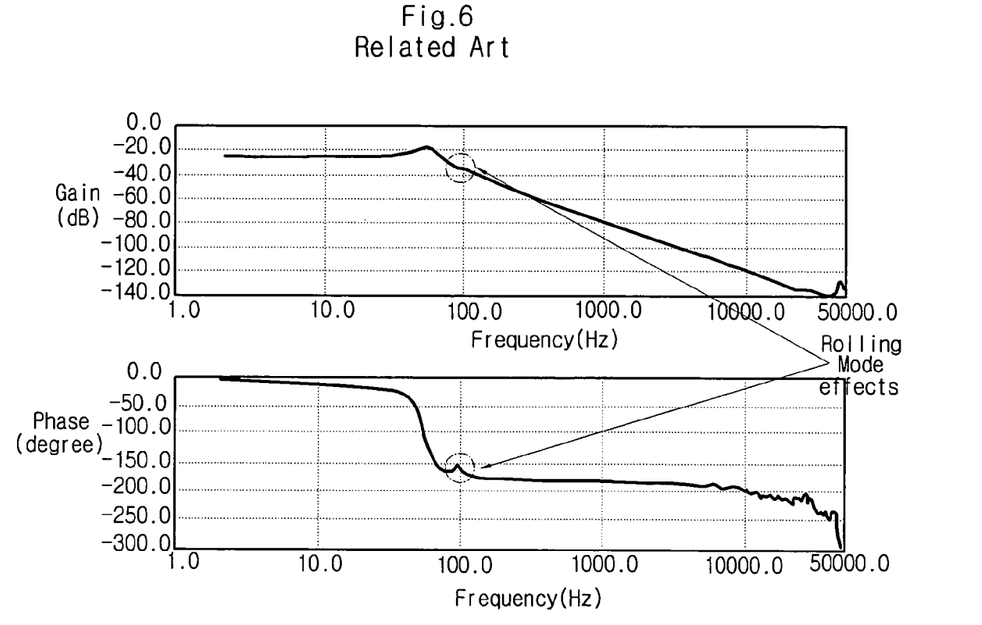
FIG. 6 is graphs showing relations between a phase and a frequency in a rolling mode of the related optical pickup actuator.

FIG. 6 is a graph showing the rolling mode effects of the related optical pickup actuator through relations between a gain (DB) and a phase (degree) by frequency. The rolling mode is generated in about 100 Hz. That is, rolling is caused by inconsistency between the force centers TC and WC in the high band.

Still referring to FIG. 5, rolling is caused by inconsistency between the force center WC in the height direction and the force center TC in the tracking direction. That is, the force center in the height direction is disposed at the center of the lens holder, but the force center in the tracking direction is disposed at the center of the tracking coil. When the lens holder is driven in the tracking direction, the force center in the tracking direction is changed due to unbalance of the magnetic force generated between the magnets and the tracking coils.

In addition, the force center is upwardly inclined from the very center due to magnetic flux distribution by the multipolar magnets. To solve the above problems, as shown in FIGS. 1A and 3, dummy masses 120 and 220 are adhered to the top ends of the lens holder, for lifting the weight center WC. However, the dummy masses 120 and 220 increase a weight of the lens holder, to reduce sensitivity in the high band.

SUMMARY OF THE INVENTION

An object of the invention is to solve at least the above problems and/or disadvantages and to provide at least the advantages described hereinafter.

Accordingly, one object of the present invention is to solve the foregoing problems by providing an optical pickup actuator which can efficiently remove phase dispersion by a rolling mode by adhering transformed coils to a lens holder.

Another object of the present invention is to provide an optical pickup actuator which coils tracking coils facing multipolar magnets to have a narrow top and a wide bottom and adheres the tracking coils to a lens holder.

Another object of the present invention is to provide an optical pickup actuator which coils tracking coils in a trapezoid or hexagonal shape.

The foregoing and other objects and advantages are realized by providing an optical pickup actuator including: a lens holder having an object lens; focusing coils disposed at the sides of the lens holder; tracking coils disposed at the sides of the lens holder; and multipolar magnets facing the focusing coils and the tracking coils disposed at the lens holder, wherein each of the tracking coils includes a right/left symmetrical structure having a width of a bottom coil larger than a width of a top coil, and having their rotation centers face boundary surfaces of polarities of the multipolar magnets in order to generate backward torque in the tracking direction rotation.

According to another aspect of the invention, an optical pickup actuator includes: a lens holder having an object lens; and a driving means for changing a position of the lens holder by using an electromagnetic force, wherein the driving means includes multipolar magnets and tracking coils for changing the position of the lens holder to the tracking direction each of the tracking coils has a top coil, a bottom coil and side coils, and the whole or part of the side coils has an angle smaller than 90° to a horizontal line.

According to another aspect of the invention, an optical pickup actuator includes: a lens holder having an object lens; and a driving means for changing a position of the lens holder by using an electromagnetic force, wherein the driving means includes multipolar magnets and tracking coils for changing the position of the lens holder to the tracking direction each of the tracking coils has a top coil, a bottom coil and side coils, and the whole or part of the side coils has an inclination angle smaller than 90° to boundary surfaces of polarities of the multipolar magnets.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present an optical pickup actuator according to a preferred embodiment of the invention in reference to the accompanying drawings.

Figure 7A:
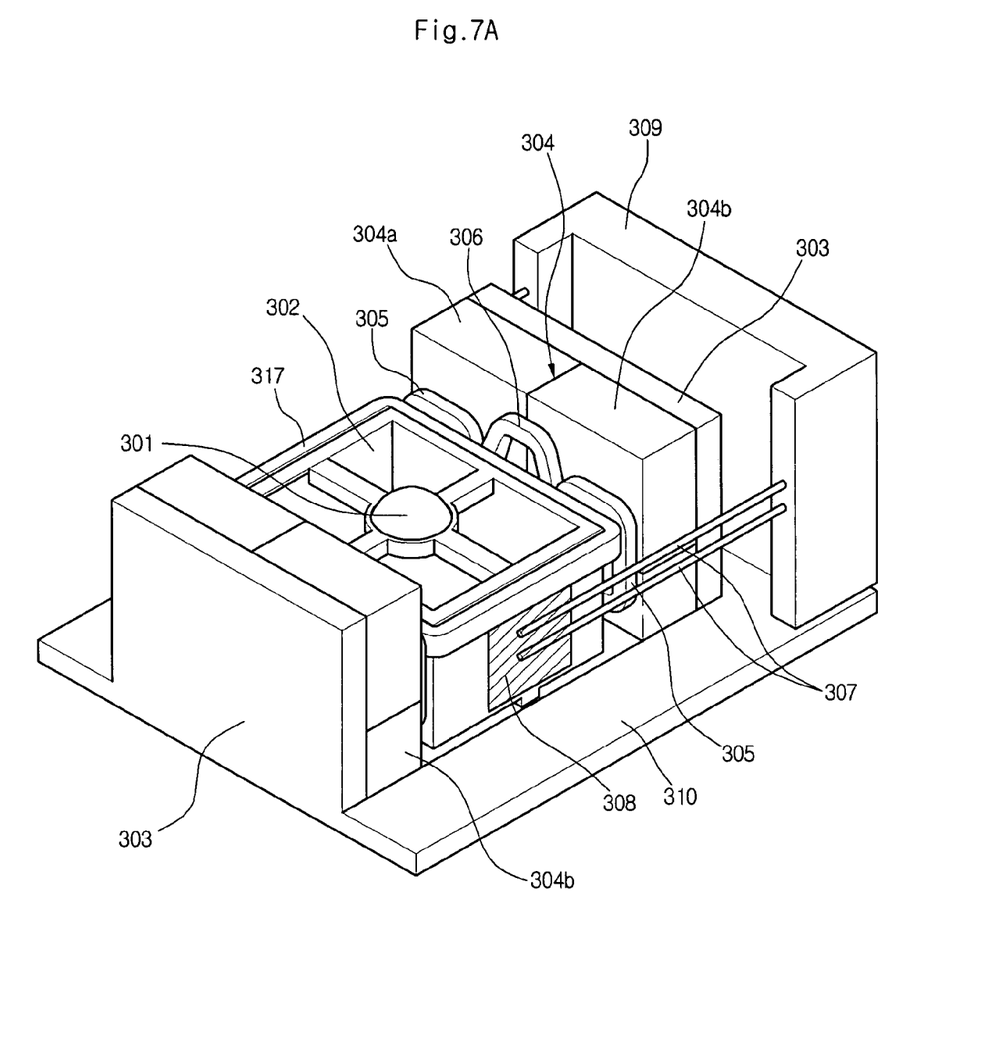
FIGS. 7A and 7B are perspective views illustrating an optical pickup actuator in accordance with a preferred embodiment of the present invention.
Figure 7B:
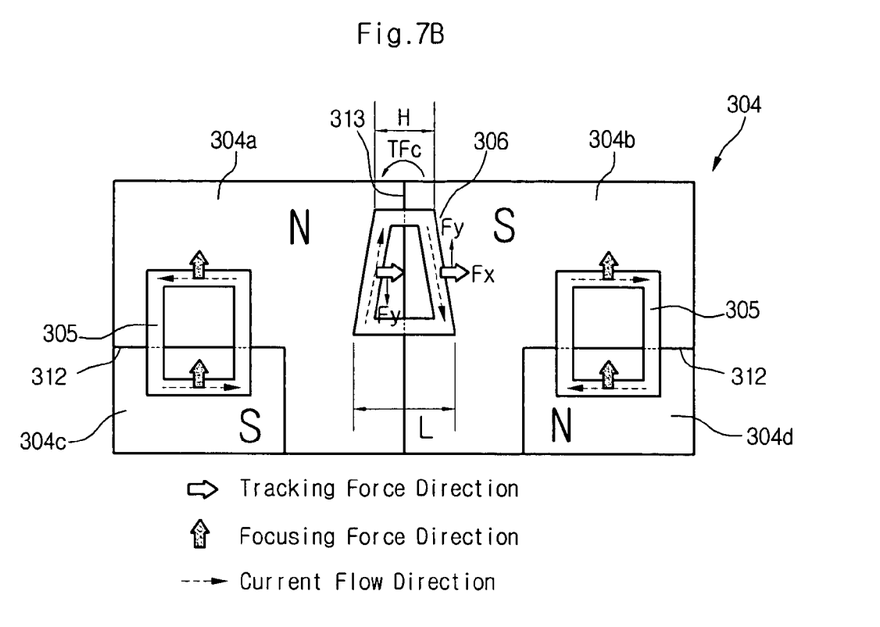

Referring to FIGS. 7A and 7B, the optical pickup actuator includes a lens holder 302 having an object lens 301 at its center portion and being movable, and a magnetic circuit coupled to the sides of the lens holder 302, for moving the lens holder 302. The magnetic circuit includes tracking and focusing coils 305 and 306, yokes 303 and multipolar magnets 304.

Still referring to FIG. 7B, the focusing coils 305 are adhered to the left and right sides of both sides of the lens holder 302. The centers of the focusing coils 305 are formed to face vertical boundary surfaces 312 of polarities of the magnets 304.

In addition, the tracking coils 306 are adhered to the centers of both sides of the lens holder 302. The centers of the tracking coils 306 are formed to face horizontal boundary surfaces 313 of polarities of the magnets 304.

In FIGS. 7A and 7B, the tracking coils 306 and the focusing coils 305 are formed on the lens holder 302, and the yokes 303 and the magnets 304 are separated from the lens holder 302. However, it must be recognized that the yokes and magnets can be formed on the lens holder and the tracking coils and the focusing coils can be separated from the lens holder.

Still referring to FIG. 7B, in the magnet 304, "⌐"-shaped magnets 304a and 304b are disposed to be symmetrical to each other, and magnets 304c and 304d having the opposite polarities to polarities of the "⌐"-shaped magnets 304a and 304b are disposed at the bottom left and right ends.

One multipolar magnet or four unipolar magnets can be used as the magnet 304.

Here, the tracking coils 306 adhered to the centers of the left and right sides of the lens holder 302 are coiled so that a width of bottom coils can be larger than a width of top coils.

Figure 8:
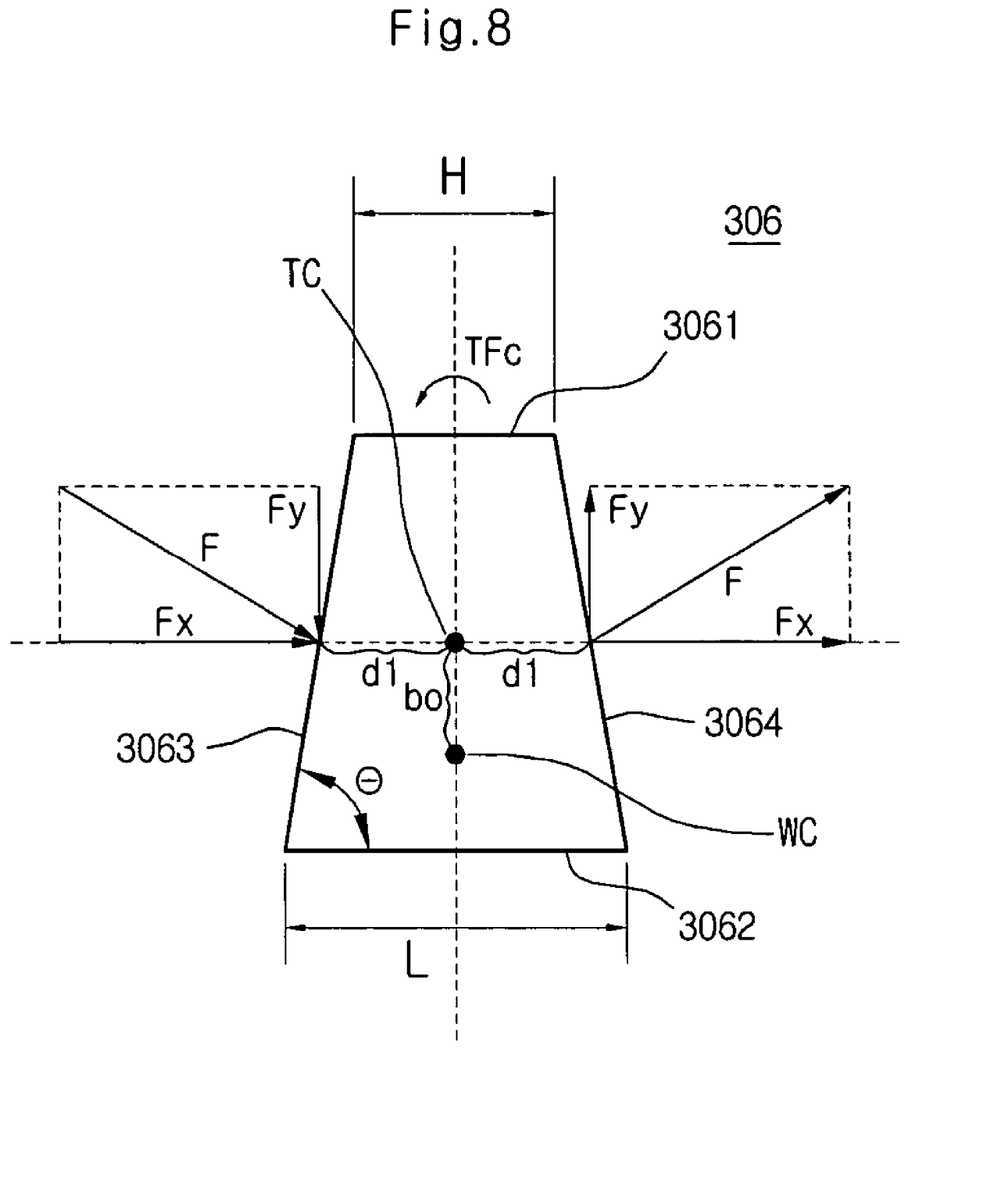
FIG. 8 is a vector graph showing a force of a tracking coil in accordance with the preferred embodiment of the present invention.

As shown in FIG. 8, the tracking coils 306 can be formed in a trapezoid shape.

The magnets 304 are fixed to the inside surfaces of the yokes 303 which are ferromagnetic structures disposed at both sides of the lens holder 302. The yokes 303 are coupled to a pickup base 310 by an integrating means.

Fixing units 308 are formed at the centers of both sides of the lens holder 302. One-side ends of two parallel wire suspensions 307 are fixed to each of the fixing units 308, and the other-side ends of the wire suspensions 307 are fixed to a circuit board (not shown) through a frame 309 formed on one side of the lens holder 302.

The wire suspensions 307 serve as junction lines for lifting the lens holder 302 and supplying a current.

Here, a damper (not shown) is coupled to the inside of the frame 309 to give a damping characteristic to the wire suspensions 307 having rigidity. The other-side ends of the wire suspensions 307 are fixed to the circuit board disposed outside the frame 309 by soldering.

As illustrated in FIGS. 7A and 7B, the focusing coils 305 adhered to the left and right sides of both sides of the lens holder 302 are coiled to generate a force in the vertical direction by interactions with the magnets 304.

That is, when a current is supplied to the focusing coils 305, a magnetic flux is generated in the up/down direction. Here, a magnetic flux of the multipolar magnets 304 facing the focusing coils 305 is electromagnetically operated, to generate a force in the focusing coils 305 in the vertical direction. Accordingly, the lens holder 302 moves in the focusing direction (vertical up/down), to operate a focusing servo for compensating for a focusing error.

The tracking coils 306 adhered to the centers of both sides of the lens holder 302 move the lens holder 302 in the tracking direction (left, right) by a repulsive force, to operate a tracking servo for compensating for a tracking error.

Here, the lens holder 302 moves in the tracking direction by a tracking force. In a rolling mode caused by inconsistency between a weight center WC and a tracking force center TC in the lens holder 302, the inconsistency between the weight center WC and the tracking force center TC is compensated for by a backward compensation torque TFc generated in the tracking coils 306 with the tracking force TF, and the tracking servo is operated.

That is, the shape of the tracking coils 306 lowers the tracking force center TC.

FIG. 8 is a vector graph showing a force applied to the tracking coils in accordance with the present invention. As depicted in FIG. 8, when a current is supplied to the tracking coils 306 in a predetermined direction, a force size of the tracking coils 306 is calculated as follows.

When the current is applied to the tracking coils 306, the tracking force size F is generated at a vertical angle to an inclination side of the trapezoid. That is, vector F=vector Fx+vector Fy, which denotes the tracking force size, vector Fx denotes a force size in a tracking driving direction (X axis), and vector Fy denotes a force size in an Y axis direction.

Here, an excited torque causing rolling by the tracking driving force Fx is equivalent to Fx*bo (bo denotes a distance between TC and WC). When an inclination angle θ is 80°, Fx=F*Cos 10°, and thus F≈Fx.

In addition, Fy=F*Sin 10°, and thus F*0.17=Fy.

Fx has a similar value to that of F, not to reduce tracking sensitivity. Rolling can be removed by using Fy.

That is, the tracking coils 306 are disposed at the centers of the left and right sides of the lens holder 302 in the trapezoid shape, for moving the lens holder 302 in the tracking direction by the tracking force (F=Fx+Fy) and the compensation torque (TFc=Fy). As a result, rolling can be removed without influencing tracking sensitivity and increasing masses of the lens holder 302.

In accordance with the present invention, the tracking coil 306 is coiled so that a width L of a bottom coil 3062 can be larger than a width H of a top coil 3061.

In the tracking coil 306, an angle of the bottom coil 3062 to side coils 3063 and 3064 connected from the bottom coil 3062 to the top coil 3061 is smaller than 90°.

More preferably, the whole or part of the side coils 3063 and 3064 has an inclination angle θ to a horizontal line. Here, the inclination angle θ is smaller than 90°.

Figure 9A:
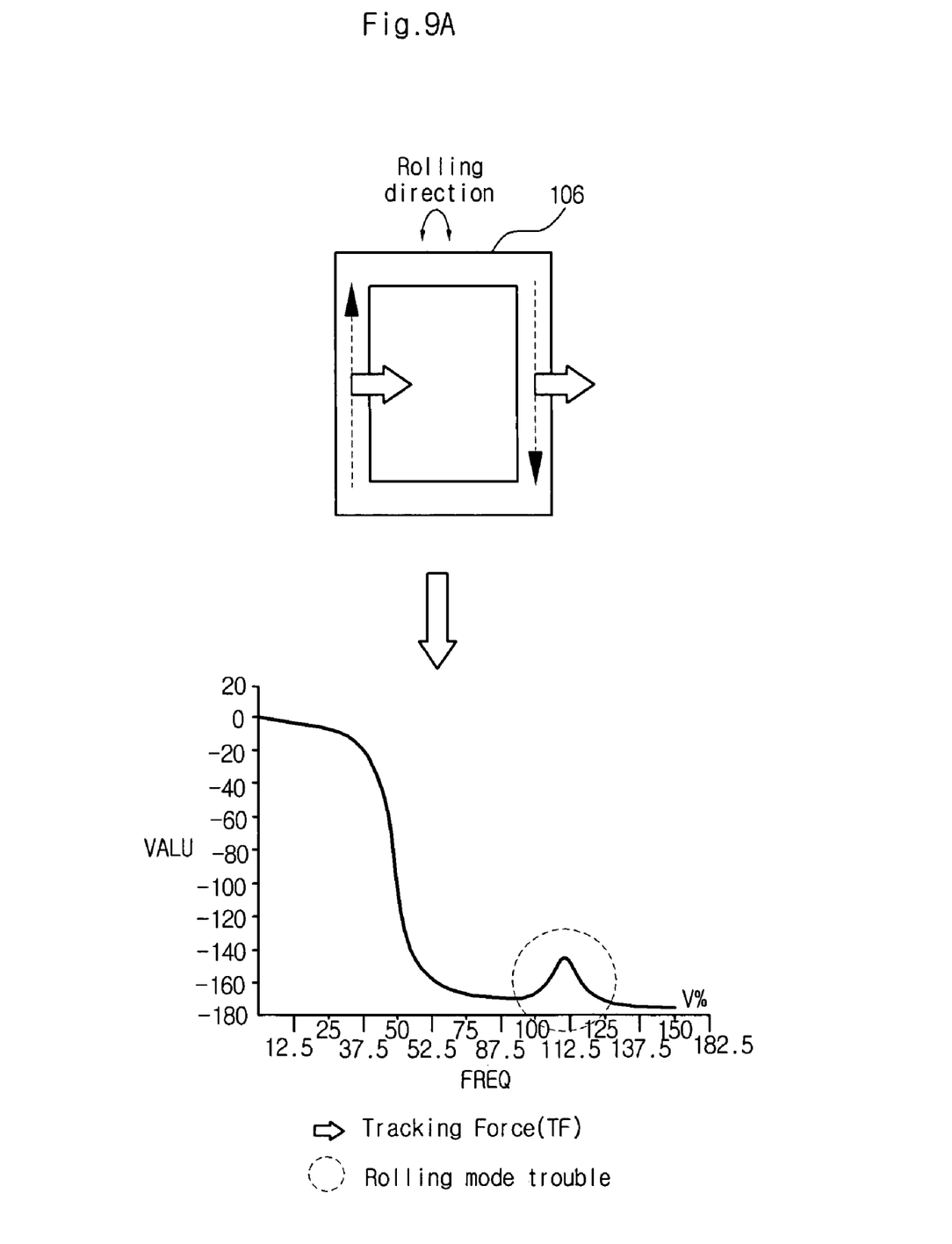
FIGS. 9A and 9B compare the magnetic circuit of FIG. 2 with a magnetic circuit of the optical pickup actuator in accordance with the preferred embodiment of the present invention.
Figure 9B:
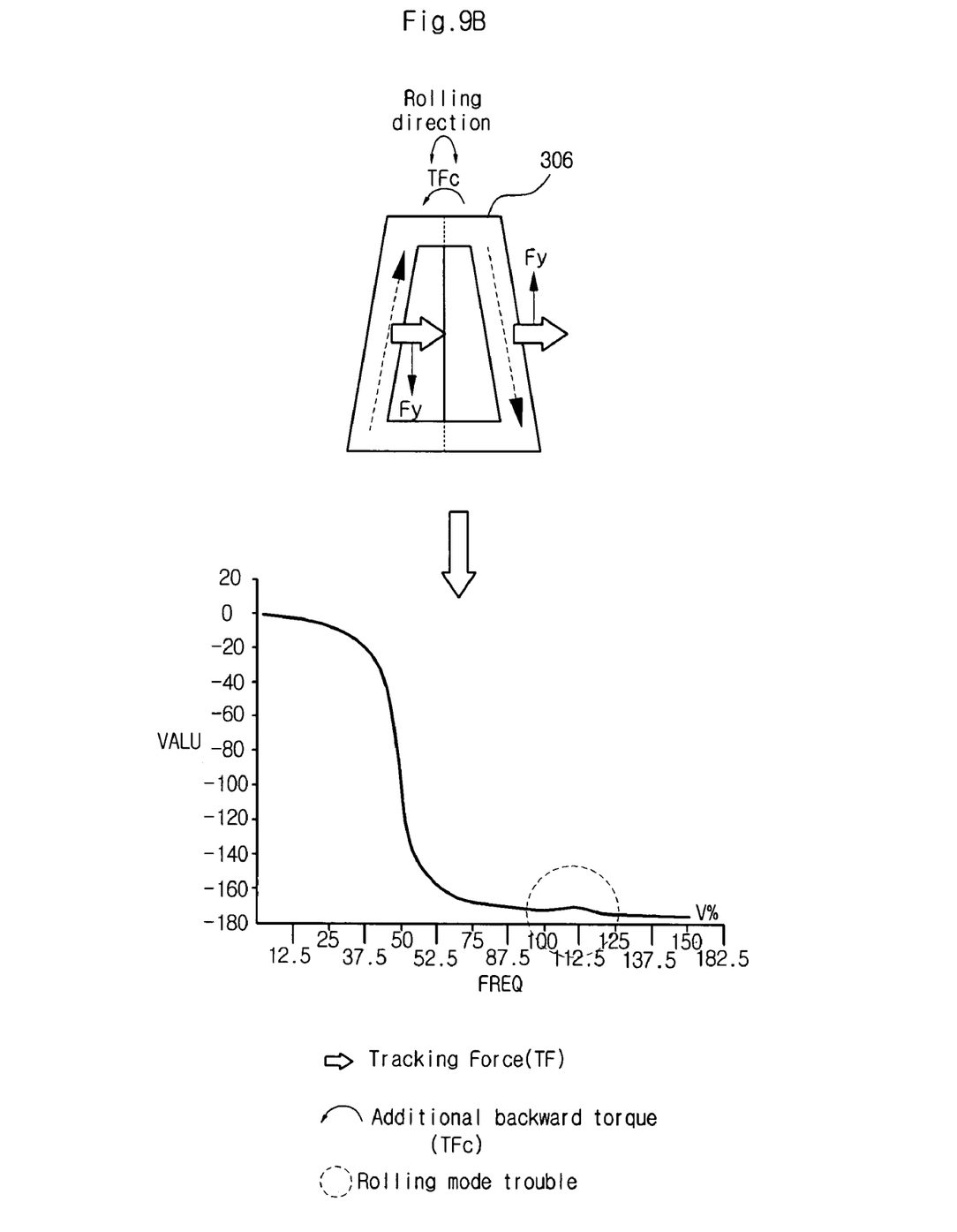

FIGS. 9A and 9B compare tracking direction driving states and frequency characteristics in the related art and the present invention. As shown in FIGS. 9A and 9B, the shape of the tracking coils adhered to the lens holder is transformed from a square to trapezoid, to generate the backward torque TFc by inconsistency between the tracking force center TC and the weight center WC. Therefore, the residual torque is removed and rolling is prevented.

Figure 10:
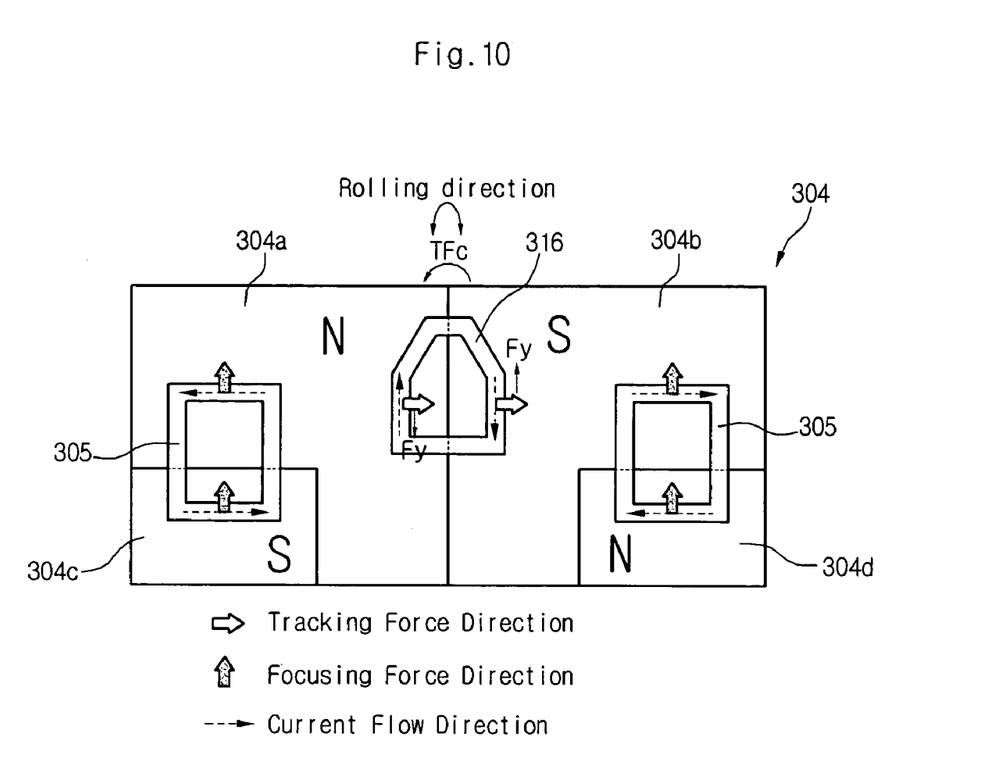
FIG. 10 is a structure view illustrating another example of the magnetic circuit of the optical pickup actuator in accordance with the preferred embodiment of the present invention.

FIG. 10 is a structure view illustrating another example of the magnetic circuit. Tracking coils 316 are coiled in a hexagonal shape so that a width of bottom coils can be larger than a width of top coils.

Figure 11:
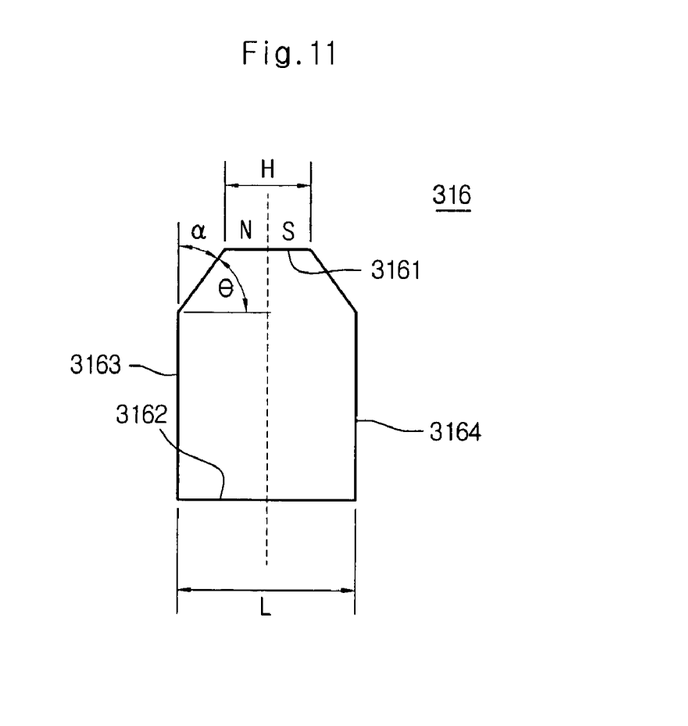
FIG. 11 illustrates characteristics of the tracking coil of FIG. 10.

As illustrated in FIGS. 10 and 11, in the tracking coil 316, a width H of the top coil 3161 is smaller than a width L of the bottom coil 3162.

In addition, in the tracking coil 316, side coils 3163 and 3164 are formed to connect the top coil 3161 to the bottom coil 3162. The whole or part of the side coils 3163 and 3164 has an inclination angle θ to a horizontal line, and the inclination angle θ is smaller than 90°.

Especially, the side coils 3163 and 3164 have an inclination angle θ to a horizontal line on which the tracing force center TC is positioned, and the inclination angle θ is smaller than 90°.

Moreover, the whole or part of the side coils 3163 and 3164 has an inclination angle α to boundary surfaces of polarities of the multipolar magnets, and the inclination angle α is smaller than 90°.

Figure 12:
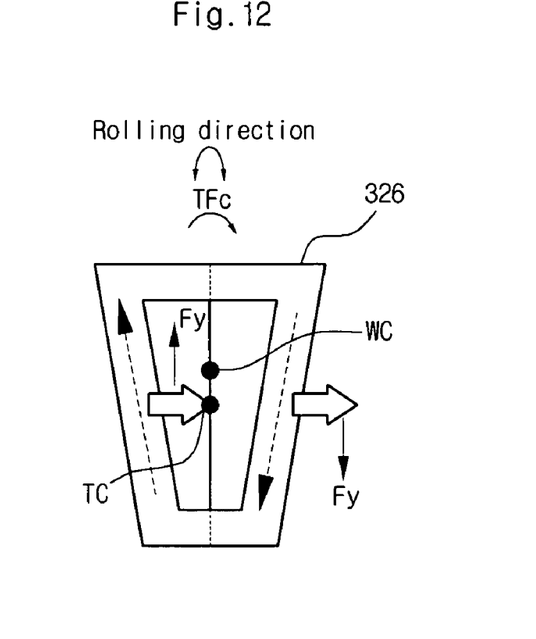
FIG. 12 illustrates another example of the tracking coil.

FIG. 12 illustrates another example of the tracking coil.

As shown in FIG. 12, a tracking coil 326 is formed to have a width of a top coil larger than a width of a bottom coil.

Here, the tracking force center TC is lower than the weight center WC in the tracking direction driving of the lens holder.

In this case, dummy masses can be removed to prevent rolling. However, it can be much easier to apply the principle of FIGS. 8 and 11 in the opposite manner.

Figure 13:
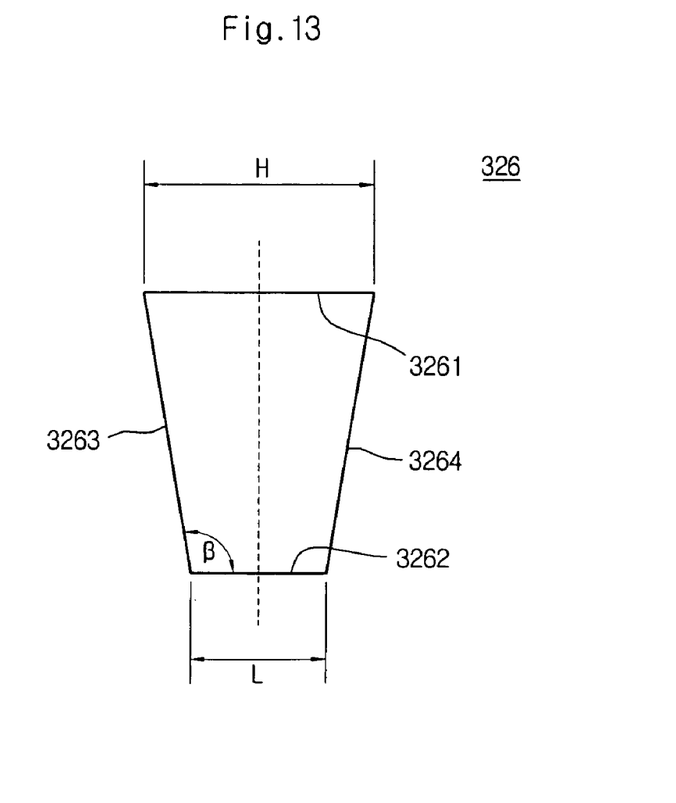
FIG. 13 illustrates characteristics of the tracking coil of FIG. 12.

As shown in FIG. 13, that is, the tracking coil 326 is coiled so that a width L of a bottom coil 3262 can be smaller than a width H of a top coil 3261.

In the tracking coil 326, an angle β of the bottom coil 3262 to side coils 3263 and 3264 connected from the bottom coil 3262 to the top coil 3261 is larger than 90°.

More preferably, the whole or part of the side coils 3263 and 3264 has an inclination angle β to a horizontal line. Here, the inclination angle β is larger than 90°.

As discussed earlier, in accordance with the present invention, in a drive system for reproducing and recording a high density disc, in order to remove phase dispersion by the rolling mode, the optical pickup actuator generates the backward torque for offsetting the torque caused by inconsistency between the tracking force center and the weight center by changing the shape of the tracking coils, thereby removing the residual torque.

As a result, the optical pickup actuator implements a stabilized control system by preventing phase dispersion by rolling, without reducing high band sensitivity.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An optical pickup actuator, comprising:
a lens holder having an object lens; and
a driving means for changing a position of the lens holder by using an electromagnetic force,
wherein the driving means comprises multipolar magnets and tracking coils for changing the position of the lens holder to the tracking direction, each of the tracking coils has a top, bottom, and sides, and the sides are inclined to a horizontal line, when a tracking force center is higher than a weight center in the tracking direction of the lens holder, the top of the tracking coil is narrower than the bottom.

2. The actuator of claim 1, wherein, when a tracking force center is lower than a weight center in the tracking direction of the lens holder, the top of the tracking coil is wider than the bottom.

3. An optical pickup actuator, comprising:
a lens holder having an object lens; and
a driving means for changing a position of the lens holder by using an electromagnetic force,
wherein the driving means comprises multipolar magnets and tracking coils for changing the position of the lens holder to the tracking direction, each of the tracking coils has a top, bottom, and sides, and, when a tracking force center is higher than a weight center in the tracking direction of the lens holder, the whole or part of the side coils has an angle less than 90° to a horizontal line.

4. The actuator of claim 3, wherein the tracking coils are disposed at the sides of the lens holder, and the multipolar magnets are disposed to face the tracking coils separately from the lens holder.

5. The actuator of claim 3, wherein the sides of the tracking coil have an inclination angle to the horizontal line on which the tracking force center is positioned, and the inclination angle is less than 90°.

6. The actuator of claim 3, wherein the top of the tracking coil is narrower than the bottom.

7. The actuator of claim 3, wherein the driving means further comprises multipolar magnets and focusing coils for changing the position of the lens holder to the focusing direction.

8. An optical pickup actuator, comprising:
a lens holder having an object lens; and
a driving means for changing a position of the lens holder by using an electromagnetic force,
wherein the driving means further comprises multipolar magnets and tracking coils for changing the position of the lens holder to the tracking direction, each of the tracking coils has a top, bottom, and sides, and, when a tracking force center is higher than a weight center in the tracking direction of the lens holder, the whole or part of the sides has an inclination angle less than 90° to boundary surfaces of polarities of the multipolar magnets.

9. The actuator of claim 8, wherein the tracking coils are disposed at the sides of the lens holder, and the multipolar magnets are disposed to face the tracking coils separately from the lens holder.

10. The actuator of claim 8, wherein the sides of the tracking coil have an inclination angle to a horizontal line on which the tracking force center is positioned, and the inclination angle is less than 90°.

11. The actuator of claim 8, wherein the top coil of the tracking is narrower than the bottom.

12. The actuator of claim 8, wherein the tracking coil is formed in a trapezoid shape having a narrow top and wide bottom.

13. The actuator of claim 8, wherein the tracking coil is formed in a hexagonal shape having a narrow top and wide bottom.

14. The actuator of claim 8, wherein the driving means further comprises multipolar magnets and focusing coils for changing the position of the lens holder to the focusing direction.

* * * * *